May 17, 1949.  M. M. MURPHY  2,470,105
PORTABLE LIFTING JACK
Filed Feb. 23, 1946
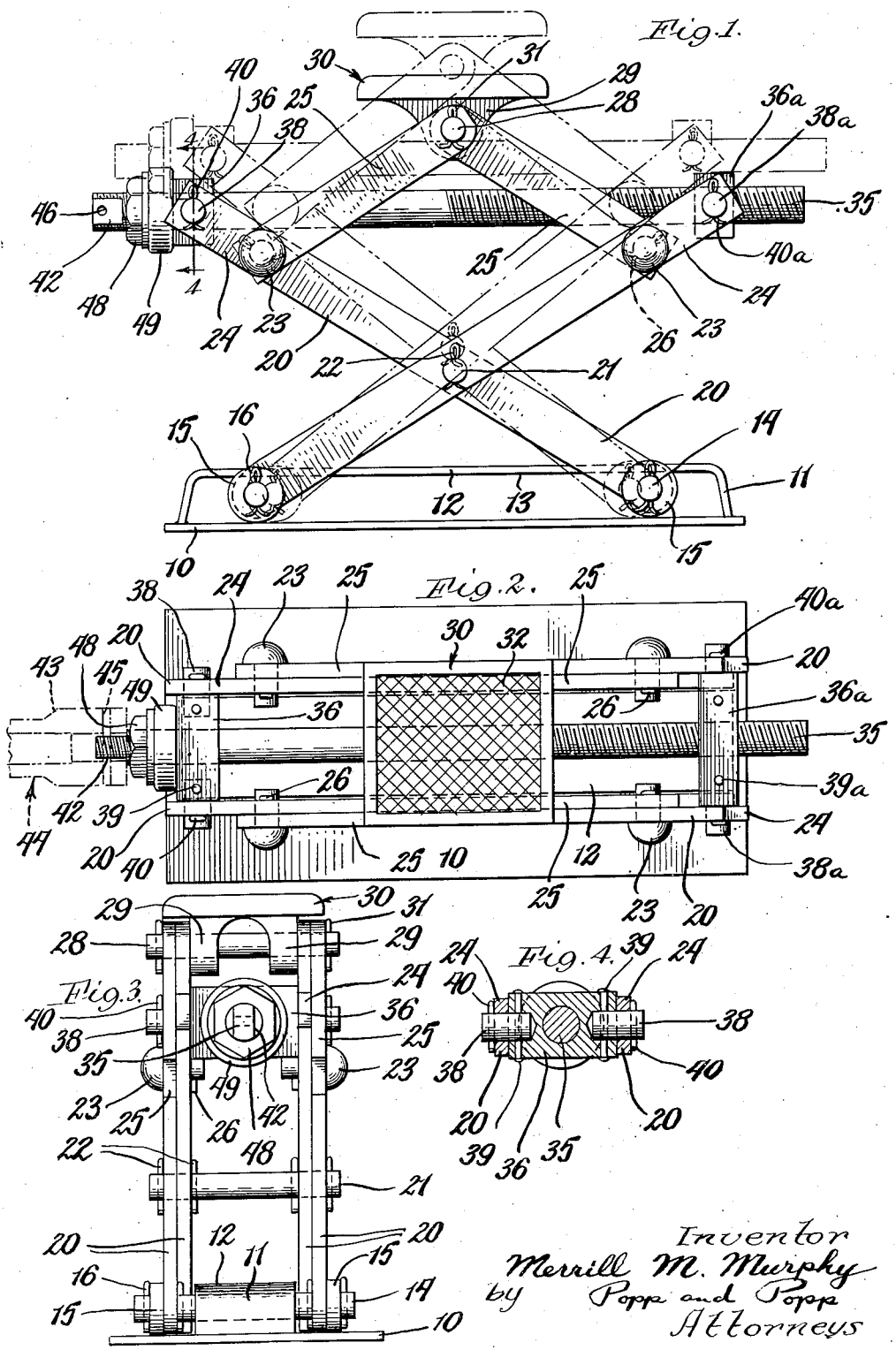
Inventor
Merrill M. Murphy
by Popp and Popp
Attorneys Patented May 17, 1949

2,470,105

UNITED STATES PATENT OFFICE 2,470,105

PORTABLE LIFTING JACK

Merrill M. Murphy, Marathon, N. Y., assignor to The Marathon Manufacturing Co., Marathon, N. Y., a corporation of New York Application February 23, 1946, Serial No. 649,715

1 Claim. (Cl. 254—126)

This invention relates to a lifting jack particularly designed to be placed under the axles of automobiles for tire repair work and more particularly to such a jack of the lazy-tong type, that is, made in the form of a lattice of collapsible pivotally connected links, the transversely opposite pivots of which are forced toward each other to effect a magnified longitudinal movement of the linkage.

One of the objects of the present invention is to provide a portable automobile jack of the lazy-tong type which collapses to a very compact condition both to permit its being readily handled and stored in the tool compartment of the automobile and also to permit of its being located under automobile axle parts which are very close to the ground when the tire to be repaired is deflated.

Another object of the invention is to provide an automobile jack which can be operated with little effort and in particular to provide a lazy-tong jack having a high leverage ratio so that less power is required to operate the same.

Another object is to provide such a lazy-tong jack which is strong and which will safety sustain heavy loads.

Another object of the invention is to provide such a lazy-tong jack which will maintain itself in centered relation to the part to be lifted, that is, in which the vertical axis of the linkage remains directly under the line of pressure of the load as the linkage is expanded and contracted.

Another object of the invention is to provide such a lazy-tong jack which is provided with a pivotally mounted head capable of adapting itself to the surface of the automobile axle to which it is applied.

Another object is to provide such a jack which can be operated either through the medium of a simple screw or through a hydraulic cylinder thereby to permit of its construction either as a screw jack or a hydraulic jack.

Other objects are to provide such a lazy-tong jack which is simple and inexpensive in construction and which will stand up under conditions of severe and constant use.

In the accompanying drawings:

Fig. 1 is a side elevation of a jack embodying the present invention and showing the same partially extended.

Fig. 2 is a top plan view thereof.

Fig. 3 is an end elevation viewed from the left hand ends of Figs. 1 and 2.

Fig. 4 is a vertical transverse sectional view taken on line 4—4, Fig. 1.

The lazy tong jack forming the subject of the present invention is of the portable type adapted for use by automobile owners and includes a relatively small base plate 10 which is adapted to be placed on the roadway underneath the end of the axle adjacent the tire to be repaired. This base plate is preferably made in the form of a simple rectangular metal plate. To the upper face of this metal plate are welded the legs 11 of a U-shaped metal retaining plate or strap 12, this plate or strap 12 being substantially narrower than the base plate 10 and extending centrally lengthwise thereof to provide a longitudinal guideway 13. The legs 11 are preferably welded to the base plate 10 near the extremities of the base plate. In the guideway 13 are arranged a pair of transverse pins or axles 14 each of which projects outwardly from opposite sides of the U-shaped metal plate or strap 12 and is supported by a pair of rollers 15. These rollers are rotatably mounted on the pins or axles 14 on opposite sides of the U-shaped plate 12 and can be retained on the pins or axles 14 in any suitable manner, as by the cotter pins 16 shown.

Each pin or axle 14 carries the lower end of a relatively long base link 20, each of these base links being interposed between the corresponding roller 15 and the U-shaped metal retaining plate 12. These relatively long base links 20 are four in number and each pair cross at the pivot pin 21 which extends through all of the links 20. Each pair of the relatively long base links 20 is shown as held in proper position by a pair of cotter pins 22 which extend through the pin 21, the pairs of base links 20 thereby being held in proper spaced relation.

At the same distance from the upper extremity of each of the base links 20 each of these base links carries a pivot pin 23 which is shown as being in the form of a headed stud inserted from the outside of each relatively long base link 20. It will therefore be seen that each base link has an extension 24 beyond each pivot pin or stud 23 which is important in securing a high leverage ratio as hereinafter described. Each of these pivot pins or studs 23 carries the lower end of a relatively short top link 25, these lower ends of these top links 25 being secured to the pivot pins or studs 23 in any suitable manner as by the cotter pins 26 shown.

The four relatively short top links 25 are of the same length and their upper ends are interconnected by a pivot pin 28. This pivot pin also carries the depending ears 29 of a head or saddle plate 30, these depending ears serving to hold the two pairs of relatively short upper links 25 in proper spaced relation. These links are retained on the pin 28 in any suitable manner as by the pair of cotter pins 31 shown. The head or saddle plate 30 is preferably of rectangular form in plan as shown in Fig. 2 and its upper surface 32 is preferably roughened to provide good frictional engagement with the part to be lifted. While the jack can be operated either hydraulically or mechanically it is shown as actuated mechanically through the medium of a horizontal screw 35 provided with operating threads for a substantial distance along one end. The unthreaded end of this screw is rotatably mounted in a block 36 which is interposed between the extremities of the extensions 24 of the base links 20 at one side of the jack. This block is secured to these extensions 24 and for this purpose is provided with a pair of studs 38 which extend through these extensions. Each of these studs is shown as secured to the block 36 by a pin 39 and a cotter pin 40 is shown as extending through each of these pins 38 on the outside of the extensions 24, the block 36 being thereby fastened to the linkage. The end of the screw 35 having the operating threads, screws into an internally threaded block or nut 36a which is secured to the extensions 24 of the relatively long base links 20 at the opposite side of the jack. Except for being threaded the block or nut 36a is identical with the block 36 and the same reference numerals have therefore been applied to corresponding parts. Outside of the unthreaded block 36 the end of the screw 35 is preferably made out of round or flat sided, as indicated at 42, to receive a correspondingly shaped socket 43 of an operating crank or handle 44, this operating crank or handle being indicated by dotted lines in Fig. 2. This operating crank or handle can also be pivotally secured to the secrew 35 by a pin 45 extending through a hole 46 through the screw 35 in the center of the flat faces 42 thereof. The flat sided end of the screw 35 is also threaded to receive a nut 48. Interposed between this nut 48 and the block 36 is a thrust bearing 49. This thrust bearing can be of any form but is preferably in the form of a high grade ball thrust bearing, inasmuch as the thrust force between the block 36 and the nut 48 is relatively large.

It will be seen that the operation of the jack is very simple. The operator places the base plate 10 of the jack on the roadway underneath the part of the axle to be engaged in lifting the axle. He then turns the crank or handle 46 in the direction to draw the nut 36a toward the center of the jack. This draws the blocks 36, 36a toward each other so as to move the upper extremities 24 of the relatively long base links 20 toward each other. Since these base links 20 are pivoted together at 21 this inward movement of the upper extremities 24 of these base links effects an upward movement thereof.

This inward movement of the upper ends of the relatively long base links 20 also effects an inward and upward movement of the pins or studs 33 which carry the relatively short upper links 25, this movement of these upper links being translated into an upward movement of the pin 28 which carries the head or saddle plate 30. When this head or saddle plate comes in contact with the part of the axle to be lifted its pivotal mounting on the pin 28 permits it to adapt itself to the underface of this part and thereby to secure good frictional contact so that there is little danger of slippage, this danger of slippage being further reduced by the roughening 32 provided on this block or saddle plate. While the toggle linkage is so extending the lower ends of the relatively long base links 20 are moving toward each other, this movement being permitted by the rollers 15 which ride on the base plate 10 and these rollers being guided in their travel by the U-shaped retaining plate or strap 12. Since the linkage is free to roll lengthwise of the plate 10 by the provision of these rollers 15, it will be seen that vertical axis of the linkage, represented by a plane intersecting the axes of the pins 21 and 28, is automatically maintained in vertical alinement with the load on this head or saddle plate 30 so that there is no tendency for the jack to draw to one side or cock and thereby cause possible accidental dropping of the load, the broad base provided by the base plate 10 and the four rollers 15 further insuring against such tipping or cocking of the jack when being applied.

The extensions 24 provided on the relatively long base links 20 is also important in securing a high leverage ratio. Thus, these extensions serve to provide a more favorable leverage so that the jack can be operated with less effort while at the same time the maximum extended height of the jack is not reduced by the provision of these extensions 24 on the base levers 20.

An important feature of the invention resides in the fact that the jack is very low when collapsed and rises to a great height when extended, this being particularly important with modern automobiles where the axle drops very close to the ground when a tire becomes flat and also must be lifted to a very great height in order to apply an inflated balloon type of tire. With the jack as shown its collapsed height is 3⅞ inches and its maximum height is 13 inches. The maximum height is, of course, obtained by the arrangement of the pivot points and links as shown and the very low collapsed height is due to the fact that in the collapsed condition of the jack the blocks 36, 36a rest on the U-shaped retaining plate or strap 12; the links 20, 25 fold together and the supporting ears 29 for the saddle plate or block 30 straddle the screw 35.

From the foregoing it will be seen that the present invention provides a very rugged and simple low cost jack which will reliably support the load and which elevates to a relatively great height and collapses to a very small compact unit so that it can be readily applied under very low axle parts and also readily stored. It will further be seen that there is little danger of the jack tipping or cocking in use and that a high leverage ratio is obtained so as to require little effort in the operation of the jack.

I claim as my invention:

A portable lifting jack, comprising a base plate adapted to be placed on a supporting surface, a lazy-tong structure comprising counterpart spaced lattices, each including a lower pair of crossed links, an upper pair of links having their upper extremities arranged alongside each other and their lower extremities arranged alongside the upper ends of said lower pair of links and parallel pivot pins connecting said upper extremities of said upper pair of links, said lower extremities of said upper pair of links with said upper ends of said lower pair of links and said crossed parts of said lower pair of links and holding said lattices in spaced relation, a pair of axles each secured to the lower ends of the corresponding lower pair of links parallel with said pivot pins, rollers supporting said axles and riding upon the upper surface of said base plate, a U-shaped retaining strap arranged between and parallel with said lattice and having a straight horizontal part arranged parallel with said base plate immediately above said axles and having depending ends secured to opposite extremities of said base plate beyond said axles, each link of said lower pair of links being extended upwardly beyond its pivotal connection with the corresponding link of said upper pair of links to provide link extensions projecting outwardly from said lazy-tong structure, a nut secured between the said extensions at one side of said lazy-tong structure, an apertured block pivotally secured bvetween the said extensions at the other side of said lazy-tong structure, a screw having a threaded portion screwed into said nut and an unthreaded portion rotatable in the aperture of said block, a thrust bearing interposed between said screw and block whereby upon turning said screw said nut and block are moved toward and from each other to expand and contract said lazy-tong structure, a supporting head having apertured depending ears embracing the pivot pin connecting the upper ends of said upper pair of links, said screw being disposed immediately above said U-shaped strap and the pivot pins connecting said upper and lower pair of links, and said ears of said supporting head straddling said screw in the extreme collapsed condition of the jack.

MERRILL M. MURPHY.

REFERENCES CITED

The following references are of record in the file of this patent:

UNITED STATES PATENTS

| Number | Name | Date |
| --- | --- | --- |
| 1,514,893 | Carlson | Nov. 11, 1924 |
| 1,545,223 | Westrate | July 7, 1925 |
| 1,652,821 | Fee-Hern et al. | Dec. 13, 1927 |
| 1,954,558 | Conrad | Apr. 10, 1934 |

FOREIGN PATENTS

| Number | Country | Date |
| --- | --- | --- |
| 334,283 | Great Britain | Sept. 4, 1930 |
| 667,457 | France | June 17, 1929 |